United States Patent [19]

Low

[11] Patent Number: 4,658,193

[45] Date of Patent: Apr. 14, 1987

[54] SENSING ARRANGEMENT

[76] Inventor: Robert G. M. Low, 6 Minton Close, Blakelands, Milton Keynes, England

[21] Appl. No.: 731,585

[22] Filed: May 7, 1985

[51] Int. Cl.[4] .............................................. G05B 1/06
[52] U.S. Cl. .................................... 318/568; 318/632; 318/640; 364/513
[58] Field of Search ................... 318/640, 632, 568 D; 364/513

[56] References Cited

U.S. PATENT DOCUMENTS

| | | | |
|---|---|---|---|
| 3,917,930 | 11/1975 | Davey et al. ................ | 318/632 X |
| 4,146,924 | 3/1979 | Birk et al. ..................... | 318/568 D |
| 4,260,187 | 4/1981 | Frosch ........................... | 318/640 |
| 4,292,576 | 9/1981 | Watts ............................. | 318/640 |
| 4,325,125 | 4/1982 | Buchfeld ........................ | 318/640 X |
| 4,472,668 | 9/1984 | Mutschler et al. ............ | 318/568 D |
| 4,514,674 | 4/1985 | Hollis et al. ................... | 318/640 X |

Primary Examiner—Benjamin Dobeck
Attorney, Agent, or Firm—Young & Thompson

[57] ABSTRACT

A sensor arrangement for providing positional information about a component (1) to a robot (11) comprises sensors (4,5) sensing index marks (2,3) on the component. The sensing arrangement derives signals denoting the extent of mispositioning of the object. These signals may be fed to the control unit (20) so that the robot carries out its preprogrammed task on the object in its misplaced position. Alternatively the component is shifted with the aid of said signals to a reference position.

1 Claim, 8 Drawing Figures

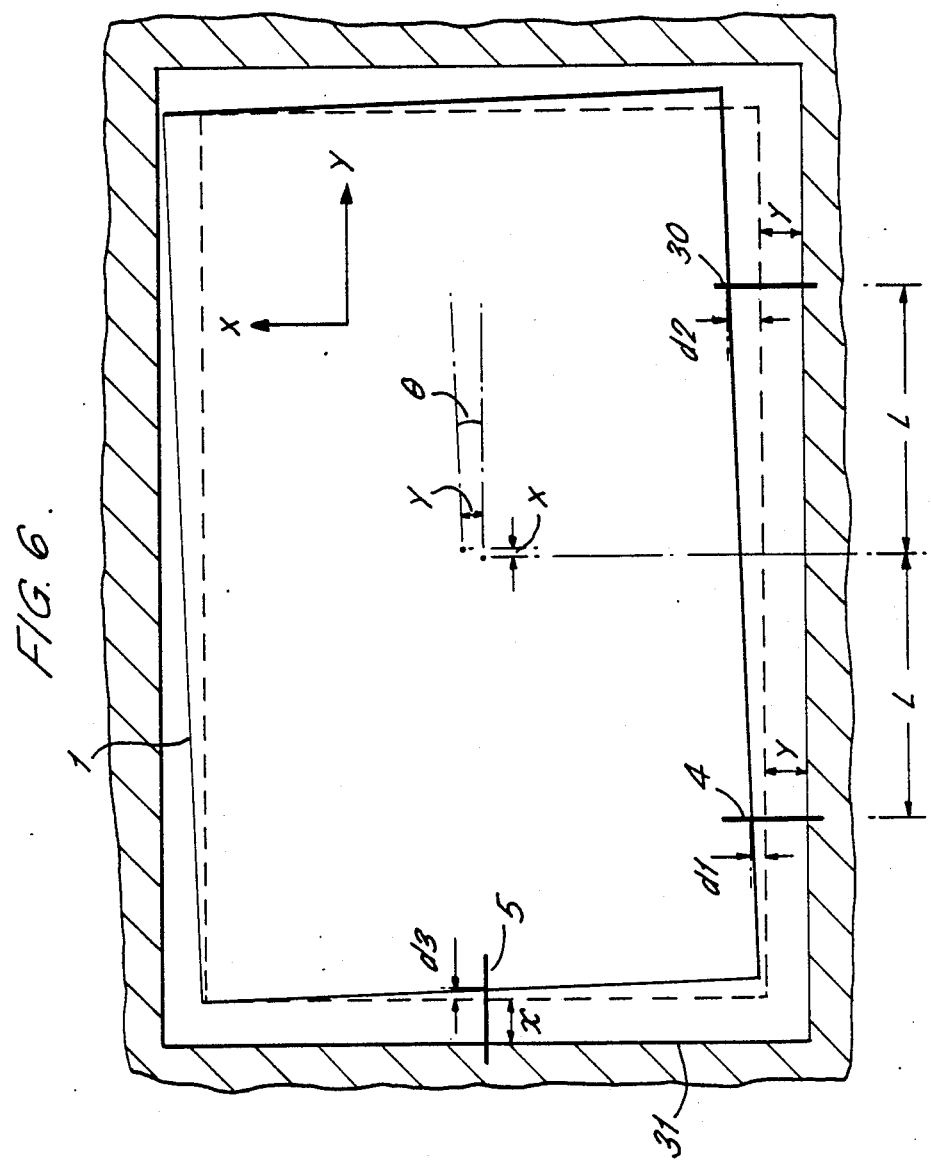

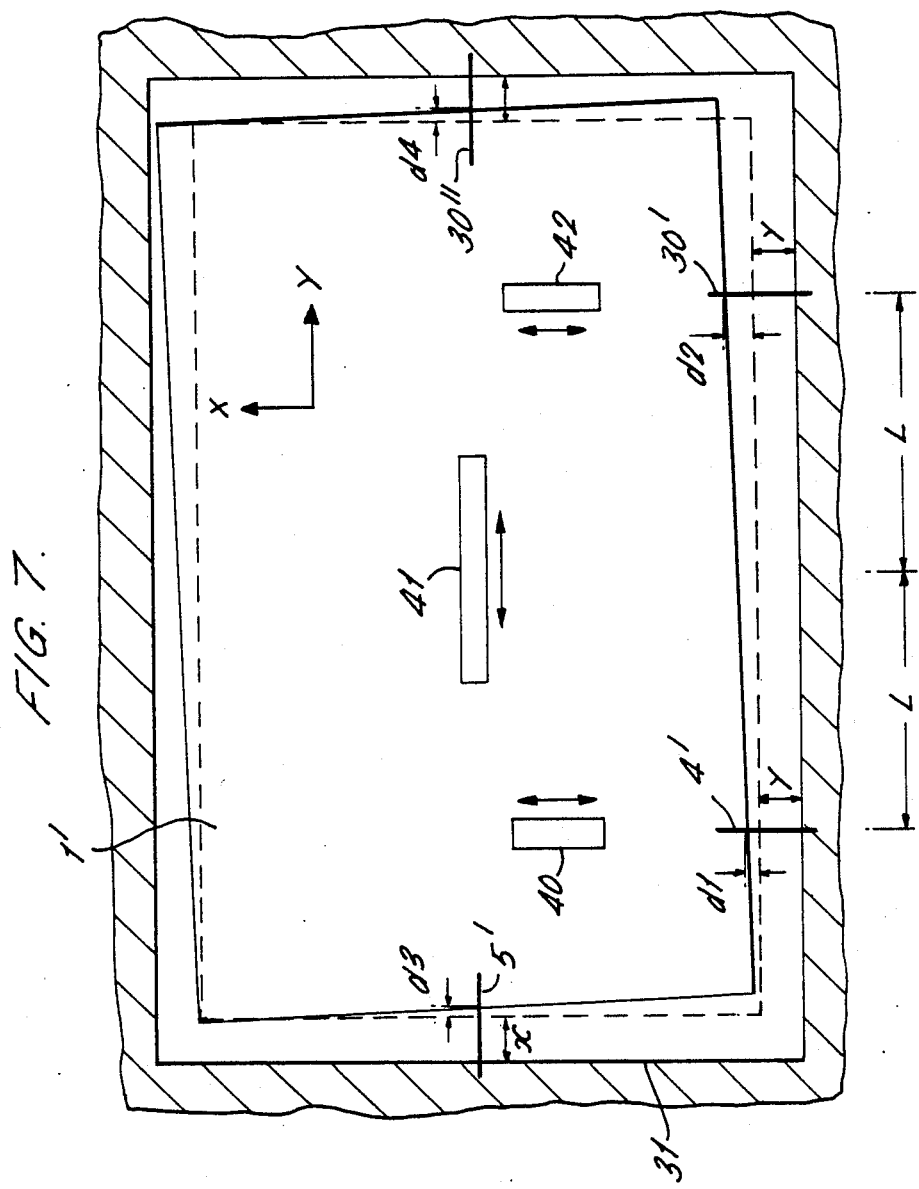

SENSING ARRANGEMENT

This invention relates to a sensing arrangement, and in particular to a sensing arrangement for providing orientation and positional information about components with which a robot is to perform a task.

Known robots or computer controlled machines are typically programmed with a sequence of instructions specifying arm movements required to perform a task with one or more components. These instructions specify the spatial and time movement of the robot arm. Commonly, at a particular time within the sequence of instructions, precise positioning of one component relative to another is required. However, the component can vary slightly in overall size and the previous handling operations can produce misplacement of the actual position and/or orientation of the component relative to its reference position within the sequence of instructions.

Although known robot control systems perform a sequence of operations for positioning small articles, for example micro-chips, when a high degree of accuracy is required and/or the article is large, for example a car body, then the above-mentioned misplacement can cause problems.

It is an object of the invention to provide a sensing arrangement to measure misplacement between a component's actual position and orientation relative to a reference position and orientation.

According to the invention there is provided a sensing arrangement comprising at least two sensors adapted to view a component and to produce signals representing in at least two dimensions a difference in position between a reference position of the component and its actual, misplaced, position.

In this way signals are produced representing the misplacement of the article. These signals can then be employed to ensure subsequent use of the component relates to the actual position of the component even though the component may have an erroneous position and/or orientation relative to a reference position.

Preferably the sensing arrangement includes at least two sensor means arranged to observe from known spatial locations respective markers on the component, the sensing arrangement includes control means to detect coordinate data of the observed markers corresponding to the actual position of the article and to compare the detected data with coordinate data of the markers corresponding to the reference position of the article and to produce said signals therefrom.

In this way the control means produces signals representing a difference between a reference position of the article and its actual misplaced position. Conveniently the control means includes store means containing the preset reference coordinate data of the markers corresponding to the reference position of the component.

In one embodiment the at least two sensors are also adapted to view a further component and the coordinate preset data corresponding to the reference position is set by the control means relative to the observed position of the further component. In this way reference markers corresponding to the reference position of the component can be provided by a known spatial difference between the markers on the component and the reference markers on a further component.

In a further embodiment the sensing arrangement includes means responsive to said signals, to move the component into said reference position. Preferably said means to move the component comprises at least two stepper motors attachable to said component. Consequently the signals cause the stepper motors to move the component in said at least two dimensions so as to move the component to its reference position.

Preferably the control means in the sensing arrangement comprises a computer and the sensor means comprises an imaging device and means to convert an image produced thereby into numerical representation. Such imaging devices can comprise a t.v. camera or an array of photosensitive cells having an address assigned to each photosensitive cell.

In another embodiment of the invention a robot control system includes a sensing arrangement as defined in claims 1 to 8, in which a robot is arranged in accordance with store positional data to perform operations with said component, the system including means to alter the stored positional data in accordance with the said signals so as to enable the robot to perform said operations on the article in the misplaced position thereof. In this way the stored positional data representing the operations to be carried out on the component can be altered in accordance with the misplacement indicated by said signals.

Examples of the present invention will now be described with reference to the accompanying drawings, in which:

FIG. 6 illustrates a component at its actual misplaced position for location to a reference position within a further component;

FIG. 7 illustrates an arrangement of stepper motors attached to a component at its actual misplaced position for location to a reference position within a further component;

Figure 1:
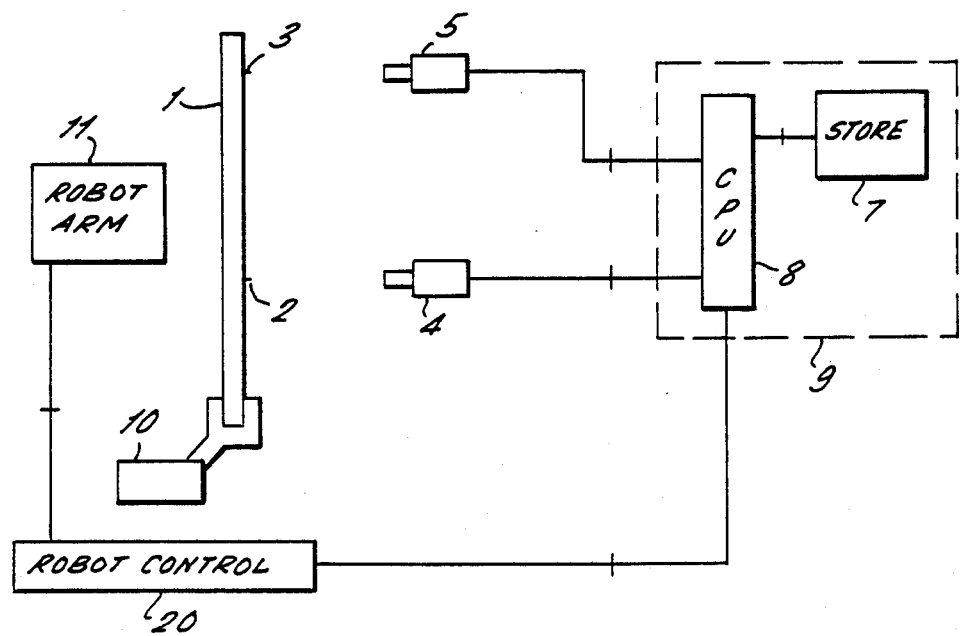
FIG. 1 illustrates a block diagram of a sensing arrangement embodying the invention in use.

Referring to the drawings, and in particular to FIG. 1, a substantially rigid component 1 is held by a mechanical holding device 10. An arm 11 of a robot is to perform some task on the component. Instructions to operate the arm to carry out its task on the component are provided from a robot control unit 20. These instructions include position and orientation data for the task relative to the component 1. Any misplacement of the component as a result say of component size error or incorrect alignment of the holding device 10 causes the task to be performed at an incorrect position and/or orientation. Where the task requires small tolerances, for example assembly on a car chassis, then the misplacement can have a detrimental effect.

Figure 3:
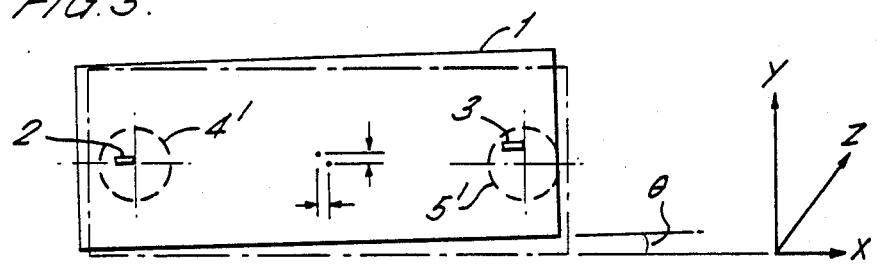
FIG. 3 illustrates a component at its actual misplaced position.
Figure 4:
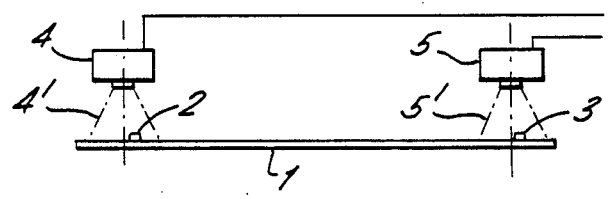
FIG. 4 illustrates the side view arrangement of the sensors shown in FIG. 1.

The planar component 1 is illustrated in FIG. 3 as having axes X and Y parallel to the plane of the component and an axis Z perpendicular to the plane of the component. The component has two reference markers 2 and 3 provided thereon which can comprise for example a hole, notch or edge.

The sensing arrangement comprises sensors 4 and 5 located in known positions separated by a distance d. These sensors are arranged to view these markers on the component. These sensors can comprise an imaging device and a means to convert an image produced thereby into a suitable numerical representation for relaying to a control unit 9. The imaging device illustrated comprises a t.v. camera, although it will be apparent that an array of photosensitive cells could also be employed or some other form of sensors based on other electromagnetic radiation or ultrasonic frequencies.

Figure 5:
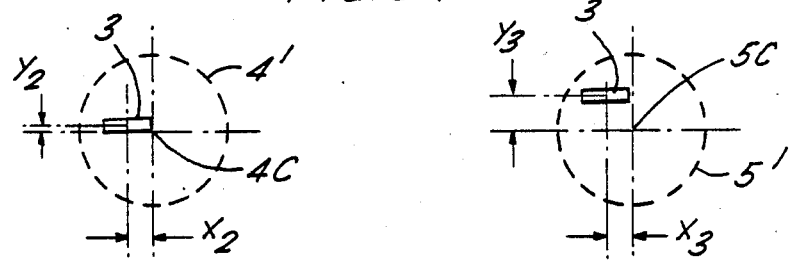
FIG. 5 illustrates the analysis of the detected marker coordinates.

The component 1 is located in the holding device at a nominal position. In this position the reference markers 2 and 3 fall within the field of view 4' and 5' of the cameras 4 and 5 respectively, as shown in FIGS. 3 and 5. The cameras are focussed to produce an image of the reference markers which can be relayed to the control unit 9. The image produced by the cameras is effectively broken down into a number of lines and segments within a line by a central processing unit 8 in the control unit 9. In this way the central processing unit can examine intensity readings for each segment and can therefore evaluate points of high and low intensity from a total image. By suitable arrangement of lighting (not shown) the markers 2 and 3 can be arranged to be points of high or low light intensity. The central processing unit 8 assigns an address to each segment and as is known from pattern comparison techniques it can locate the position of the reference marker within the overall image. Therefore, for two dimensions the central processing unit can evaluate the $X_i$, $Y_i$ coordinates for each marker. These coordinates are the coordinate data of the observed markers corresponding to the actual position of the component.

Figure 2:
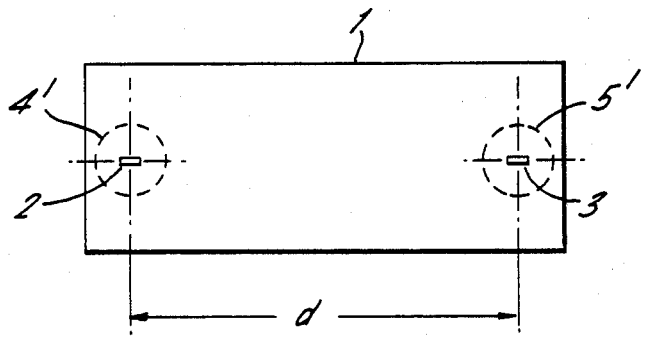
FIG. 2 illustrates a component located at its reference position.

The central processing unit 8 has access to a store 7 contained within the control unit 9. The store holds preset reference coordinate values $X_r$, $Y_r$ for each marker when the component is located in a predetermined reference position. It will be apparent that the reference coordinates are effectively an address location within the array of addresses assigned to the image produced by the sensors. Alternatively, the coordinates $X_r$, $Y_r$ for each marker can be assigned to the centre 4C and 5C of the field of view 4' and 5' respectively of the image produced by the sensors 4 and 5. In this way the reference coordinate data is effectively preset by location at the centre of these fields of view, as shown in FIG. 2.

In both cases the central processing unit compares the observed coordinate data $X_i$ $Y_i$ and $X_r$ $Y_r$ for each marker. The processing unit calculates the difference between the components actual position and its reference position by employing the equations:

$$Y = \frac{Y_2 + Y_3}{2}$$

$$X = \frac{X_2 + X_3}{2}$$

and rotation about Z axis $$\theta = \arcsin \frac{Y_3 - Y_2}{d}$$

Therefore, the central processing unit can evaluate the linear and rotational misplacement.

The control unit 9 then provides signals representing in at least two dimensions the difference in position between the reference position of the component and its actual, misplaced position. These signals are shown in FIG. 1 to be fed to the robot control system 20. Since the robot control unit 20 contains instructions with positional data for instructing the arm 11 to operate on the component, the signals corresponding to the misplacement between the component's actual position and its required position can alter the positional data of these operational instructions so that the operations on the component take into account the misplacement thereof. In summary, the robot control unit 20 receives signals from control unit 9, corresponding to the misplacement information and adjusts its own operational data for arm 11 so that the arm 11 performs the operations on the component in the misplaced position thereof.

Figure 8:
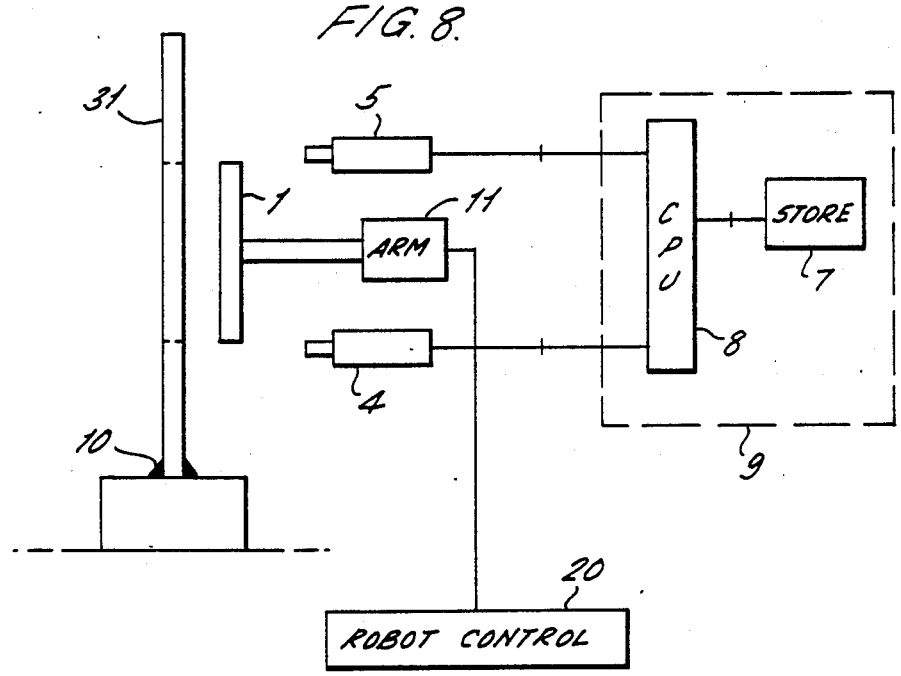
FIG. 8 illustrates a block diagram of a sensing arrangement applicable to FIGS. 6 and 7.

It will be apparent that generally the said task or operation on the component would comprise manipulating a further component relative to the component 1, the misplacement of which has been sensed. FIG. 6 illustrates a further embodiment of the sensing arrangement in accordance with the invention wherein a component 31 includes an aperture into which the component 1 is to be located. Three sensors 4, 5 and 30 are arranged as shown in FIG. 6 and 8. The sensor 30 lies behind the sensor 4 in FIG. 8. These sensors are arranged to view the components 31 and 1 so that their fields of view have within them reference markers of both components. These sensors view the edges of the aperture in component 31. FIG. 6 illustrates the component 1 as being correctly located for insertion into the aperture of component 31 when there is a difference x between the left hand aperture edge and the left hand edge of component 1 and a difference y between the lower aperture edge and the lower edge of component 1. Any misplacement of the component 1 can be sensed by the sensors 4, 5 and 30 either by preset reference coordinate data in the store 7 as above or by again locating reference coordinate points at a position in the field of view known by the central processing unit 8. The relative displacement between the actual misplaced, component position and its reference position is indicated by sensor 5 as d3, and indicated by sensor 4 as d1, and indicated by sensor 30 as d2. Provided the annular error involved between the position of the component 1 relative to the aperture of component 31 is small, and the side length of the component 1 is considerably greater than the centroid error of the component 1 relative to its reference position, then the processing unit calculates the misplacement by employing the equations:

Displacement of centroid in X direction X=d 3

Displacement of centroid in Y direction
$Y=(d2+d1)/2$

Rotation of article 1 relative to
aperture=$(d2-d1)2L$ where 2L is the distance between sensor 4 and sensor 30.

Therefore by employing sensors 4, 5 and 30 arranged as illustrated, it is possible to evaulate a misplacement in position between the correct, reference, position of the component 1 for location in the aperture of component 31 and its actual misplaced position. In this way the control unit 9 provides signals corresponding to the misplacement of component 1 relative to the observed position of component 31. The robot control unit 20 can then use the signals corresponding to the misplacement between the components to alter its operational data so that the operations on the components take this into account. In summary, the robot control unit receives signals from the control unit corresponding to misplacement information and adjusts its own operational data so that the operation of location of the component 31 with component 1 takes into account the misplaced position of the component 1.

The signals from the control unit 9 have been described hereinabove for use with a robot control system to alter the operational coordinate data thereof. FIG. 7 illustrates a further embodiment of a sensing arrangement wherein the position of the misplaced article is actually moved as opposed to altering operational coordinate data. In this embodiment, an article 31 includes an aperture into which a component 1 is to be located. Four sensors 4', 5', 30', 30" are arranged in a similar manner as shown in FIGS. 6 and 8. The sensor 30" is hidden by the sensor 5 in FIG. 8. These sensors are arranged to view components 31' and 1 so that their fields of view have within them reference markers of both components. The sensors view the edges of component 1 relative to the edges of the aperture of component 31'. FIG. 7 illustrates component 1 as being correctly located for insertion into the aperture of component 31' when there is a difference x between left hand and right hand aperture edges and left hand and right hand edges of component 1 and a difference y between the lower edge of the aperture in component 31' and the lower edge of component 1. Any misplacement of the article 1 can then be sensed by the sensors 4, 5, 30' and 30" as above.

The sensing arrangement shown in FIG. 7 also includes stepper motor means capable of moving component 1 relative to component 31'. The stepper motor means are illustrated by stepper motor drive 40, 41 and 42. The drives can be driven by the signals produced by the control unit 9. Initially drive 40 is activated as a result of the signal from control unit 9 to adjust the position of component 1 relative to the component 31' to reduce to y the gap between the lower edge of the aperture 31' and the component 1. The drive 42 is then activated by the signals from control unit 9 to reduce to y the gap between the lower edge of the aperture in component 31' and the lower edge of component 1. Sensors 4' and 30' will in this situation indicate that there is no misplacement of the component 1 relative to the component 31' for the Y axis. Thereafter, the control unit signals activate drive 41 to operate until the gap between left and right hand edges of the aperture in component 31 and the left and right hand edges of component 1 reduce to x (assuming nominal accurancy of the component 1). In this situation the sensors 5' and 30" no longer indicate misplacement between components 31' and 1 so the control unit 9 no longer produces signals representing misplacement. Therefore, the signals produced from control unit 9 corresponding to the misplacement of the article 1 relative to the observed position of component 31' are used to operate stepper motors to move the component 1 relative to the component 31'. This is particularly useful where the component 1 is held by a robot arm for insertion into a component 31' which is on a conveyor belt separate from the robot having the robot arm. The stepper motors are then actuated by the signals from the control unit 9 to bring the component 1 into its correct, reference, position for insertion into the aperture in component 31'. It will be apparent that the stepper motors could be provided to move component 31'.

Therefore the sensing arrangement embodying the invention produces signals representing a misplacement in position between a reference position of a component and its actual, misplaced position. These signals can then be employed to either alter the positional data contained in the instructions of a robot control unit to enable the robot to perform the operations on the article in the misplaced position thereof or can be employed to enable the sensing arrangement itself to move the position of the observed component from its misplaced position to the reference position.

The sensors described hereinabove can be of any type which provide an image or numerical representation either directly or indirectly of reference markers which enable its coordinates to be evaluated. The sensors can be visual or based on other electromagnetic radiation, for example infrared or ultraviolet or ultrasonic.

I claim:

1. A control system for controlling the insertion of a component into an aperture, comprising:

means for providing markers on said component;

at least two viewing sensors disposed in predetermined fixed positions to view said component and said aperture and responsive to said markers to produce signals representing gaps between edges of said components and corresponding edges of the aperture; and drive means responsive to said signals and coupled to produce relative movement between the component and the aperture to reduce said gaps to respective predetermined values.

* * * * *